US011820267B2

(12) United States Patent
Kadam et al.

(10) Patent No.: US 11,820,267 B2
(45) Date of Patent: Nov. 21, 2023

(54) VEHICLE SEAT

(71) Applicant: Ford Global Technologies, LLC, Dearborn, MI (US)

(72) Inventors: Mangesh Kadam, Canton, MI (US); Yuqin Zhao, Troy, MI (US); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1123 days.

(21) Appl. No.: 16/437,931

(22) Filed: Jun. 11, 2019

(65) Prior Publication Data

US 2020/0391631 A1 Dec. 17, 2020

(51) Int. Cl.
*B60N 2/427* (2006.01)
*B60N 2/42* (2006.01)
*B60N 2/02* (2006.01)
*B60N 2/62* (2006.01)
*B60N 2/90* (2018.01)

(52) U.S. Cl.
CPC ......... *B60N 2/4279* (2013.01); *B60N 2/0224* (2013.01); *B60N 2/0244* (2013.01); *B60N 2/0276* (2013.01); *B60N 2/4221* (2013.01); *B60N 2/4235* (2013.01); *B60N 2/42718* (2013.01); *B60N 2/42763* (2013.01); *B60N 2/62* (2013.01); *B60N 2/42772* (2013.01); *B60N 2/42781* (2013.01); *B60N 2/99* (2018.02); *B60N 2002/0204* (2013.01); *B60N 2002/0212* (2013.01); *B60N 2002/0216* (2013.01); *B60N 2002/952* (2018.02)

(58) Field of Classification Search
None
See application file for complete search history.

(56) References Cited

U.S. PATENT DOCUMENTS

| 4,324,431 | A | * | 4/1982 | Murphy | B60N 2/62 297/284.11 |
|---|---|---|---|---|---|
| 4,334,709 | A | * | 6/1982 | Akiyama | B60N 2/62 297/312 |
| 4,664,444 | A | * | 5/1987 | Murphy | A47C 7/029 297/452.53 |
| 5,082,326 | A | * | 1/1992 | Sekido | B60N 2/885 297/284.6 |
| 5,101,536 | A | * | 4/1992 | Gabriele | A61G 5/128 280/42 |
| 5,240,276 | A | * | 8/1993 | Coombs | A61G 5/0891 297/42 |
| 5,556,160 | A | | 9/1996 | Mikami | |

(Continued)

FOREIGN PATENT DOCUMENTS

| DE | 102006057030 A1 | * 6/2008 | ............ B60R 21/13 |
|---|---|---|---|
| DE | 102016108572 A1 | 11/2016 | |

(Continued)

*Primary Examiner* — David E Allred
(74) *Attorney, Agent, or Firm* — Frank A. MacKenzie; Bejin Bieneman PLC

(57) ABSTRACT

An assembly includes a seat bottom including a panel pivotable from a first position to a second position. The assembly includes a track supported by the seat bottom. The assembly includes a spring in the track and urging the panel toward the second position. The assembly includes a pyrotechnic actuator maintaining the spring in compression and actuatable to release the spring.

20 Claims, 9 Drawing Sheets

(56) References Cited

U.S. PATENT DOCUMENTS

| | | | |
|---|---|---|---|
| 5,695,242 A | 12/1997 | Brantman et al. | |
| 5,833,176 A * | 11/1998 | Rubin | B64G 1/222 |
| | | | 244/172.7 |
| 6,450,573 B1 | 9/2002 | Yamaguchi et al. | |
| 8,297,697 B2 * | 10/2012 | Gross | B60N 2/42718 |
| | | | 297/284.11 |
| 9,090,185 B2 * | 7/2015 | McMillen | B60N 2/914 |
| 9,403,452 B2 * | 8/2016 | Subramanian | B60N 2/42763 |
| 9,738,187 B1 | 8/2017 | McCoy et al. | |
| 10,035,438 B2 | 7/2018 | McCoy et al. | |
| 2002/0096603 A1 * | 7/2002 | Bauer | B64G 1/443 |
| | | | 244/172.7 |
| 2003/0034679 A1 * | 2/2003 | Choi | B60N 2/4263 |
| | | | 297/216.1 |
| 2003/0230919 A1 | 12/2003 | Park | |
| 2006/0125296 A1 * | 6/2006 | Hippel | B60N 2/0276 |
| | | | 297/216.1 |
| 2006/0157959 A1 * | 7/2006 | van Poppel | B60R 21/01504 |
| | | | 280/736 |
| 2014/0306504 A1 * | 10/2014 | Boy | B60N 2/62 |
| | | | 297/313 |
| 2015/0108816 A1 * | 4/2015 | Dry | B60N 2/62 |
| | | | 297/423.19 |
| 2015/0274050 A1 * | 10/2015 | Hosbach | B60N 2/02 |
| | | | 297/423.26 |
| 2015/0283931 A1 * | 10/2015 | Line | B60N 2/62 |
| | | | 297/423.19 |
| 2017/0043740 A1 * | 2/2017 | Schneider | B60N 2/4221 |
| 2017/0291521 A1 * | 10/2017 | Line | B60N 2/62 |
| 2018/0370397 A1 * | 12/2018 | Rist | B60N 2/0276 |
| 2019/0031058 A1 * | 1/2019 | Boccuccia | B60N 2/4235 |
| 2019/0031138 A1 * | 1/2019 | Boccuccia | B60N 2/62 |
| 2019/0039757 A1 * | 2/2019 | Beck | B60P 7/16 |
| 2019/0276158 A1 * | 9/2019 | Sinusas | F01M 5/002 |
| 2020/0282878 A1 * | 9/2020 | Gandhi | B60N 2/99 |
| 2020/0398779 A1 * | 12/2020 | Malapati | B60R 21/01 |
| 2021/0194223 A1 * | 6/2021 | Pers | H02H 7/125 |

FOREIGN PATENT DOCUMENTS

| | | | | |
|---|---|---|---|---|
| GB | 2003383 A | * | 3/1979 | B64D 1/02 |
| GB | 2549373 A | * | 10/2017 | B60N 2/4221 |
| GB | 2549374 A | * | 10/2017 | B60N 2/427 |
| JP | 2004189097 A | * | 7/2004 | |

* cited by examiner

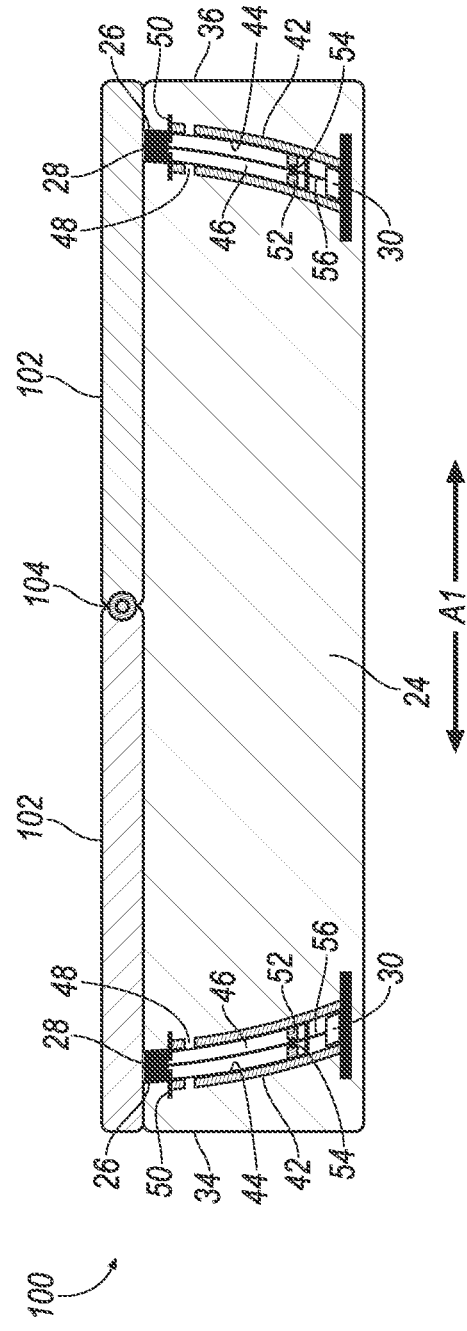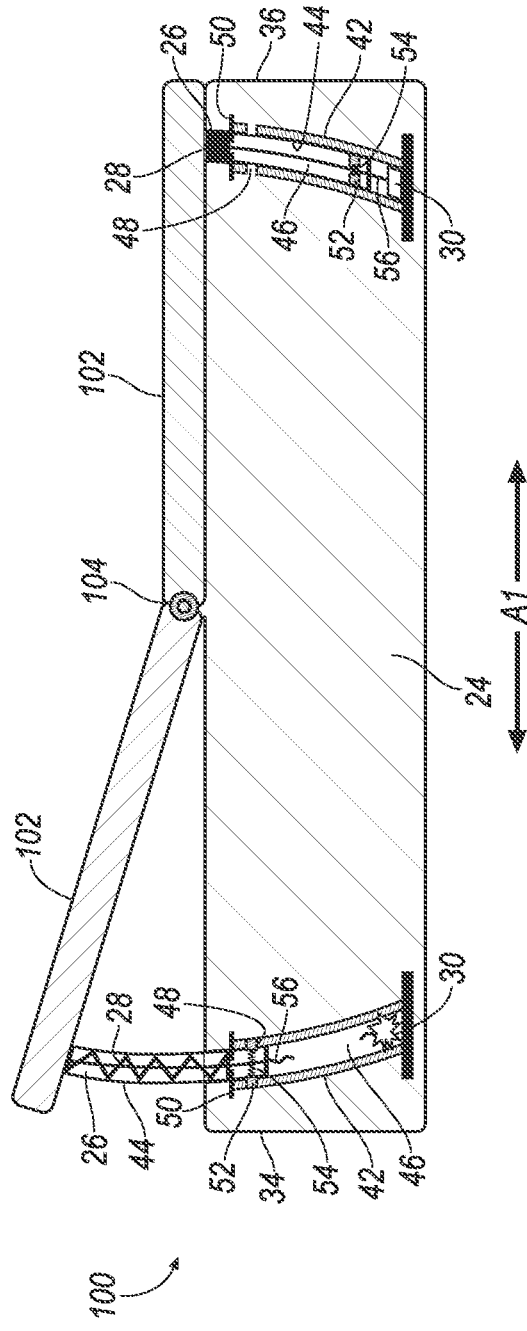

VEHICLE SEAT

BACKGROUND

A vehicle typically includes one or more seats for supporting occupants of the vehicle. The seat may include a seat back, a seat bottom, and a head restraint. The head restraint may be supported by the seat back and may be stationary or movable relative to the seat back. The seat back may be supported by the seat bottom and may be stationary or movable relative to the seat bottom. The seat back, the seat bottom, and/or the head restraint may be adjustable in multiple degrees of freedom. Specifically, the seat back, the seat bottom, and/or the head restraint may themselves be adjustable, in other words, adjustable components within the seat back, the seat bottom, and/or the head restraint, and/or may be adjustable relative to each other.

BRIEF DESCRIPTION OF THE DRAWINGS

FIG. 4 is a cross section of the seat and the system for controlling kinematics of an occupant of the seat.

FIG. 5 is a cross section of the seat and the system for controlling kinematics of an occupant of the seat.

DETAILED DESCRIPTION

Figure 1:
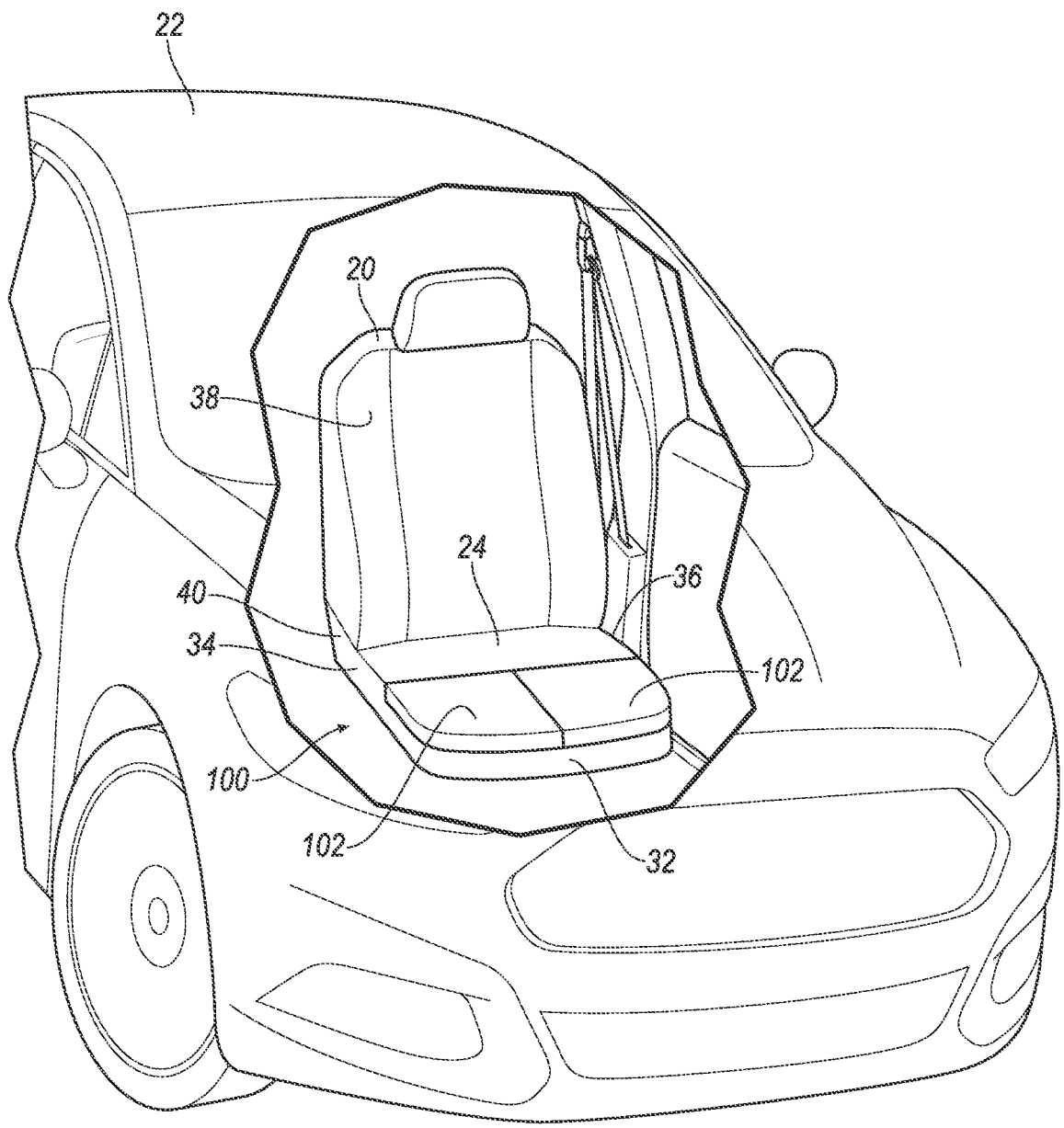
FIG. 1 is a perspective view of a vehicle having a seat and a system for controlling kinematics of an occupant of the seat.

An assembly includes a seat bottom including a panel pivotable from a first position to a second position. The assembly includes a track supported by the seat bottom. The assembly includes a spring in the track and urging the panel toward the second position. The assembly includes a pyrotechnic actuator maintaining the spring in compression and actuatable to release the spring.

The track may include a first member and a second member slidable relative to the first member.

The first member may define a passage and the second member may be in the passage.

The first member may include an opening, and the second member may include a pin in the opening when the panel is in the second position.

The panel may be pivotable about a lateral axis.

The panel may be pivotable about a longitudinal axis.

The seat bottom may include a front end and a back end, and the panel may extend from the front end to the back end.

The seat bottom may include a front end and a back end, the panel may include a front edge and a back edge, the front edge may be at the front end of the seat bottom and the back edge may be between the front end and the back end of the seat bottom.

The seat bottom may include a second panel pivotable from a first position to a second position.

The panel and the second panel may be pivotable about a same axis.

The second position may be above the first position.

An assembly includes a seat bottom including a panel pivotable about a longitudinal axis from a first position to a second position. The assembly includes an actuator maintaining the panel in the first position and actuatable to release the panel to the second position.

The assembly may include a computer having a processor and a memory storing instructions executable by the processor to actuate the actuator to move the panel to the second position in response to detecting an impact to a vehicle.

The seat bottom may include a second panel pivotable from a first position to a second position, and the first panel and the second panel may be arranged along a lateral axis.

The assembly may include a computer having a processor and a memory storing instructions executable by the processor to move the panel to the second position in response to detecting an impact to a first side of a vehicle, and to move the second panel to the second position in response to detecting an impact to a second side of the vehicle opposite the first side.

The assembly may include a computer having a processor and a memory storing instructions executable by the processor to move the panel and the second panel to the second positions in response to detecting an impact to a front of a vehicle.

The assembly may include a spring supported by the seat bottom and urging the panel toward the second position.

The seat bottom may include a first side and a second side spaced from the first side along a lateral axis, and the spring may be at the first side.

The seat bottom may include a front end and a back end, and the panel may extend from the front end to the back end.

The seat bottom may include a front end and a back end, the panel may include a front edge and a back edge, and the front edge may be at the front end of the seat bottom and the back edge may be between the front end and the back end of the seat bottom.

With reference to the Figures, wherein like numerals indicate like parts throughout the several views, an assembly 100, 200, 300 for controlling kinematics of an occupant of a seat 20 during an impact to a vehicle 22 includes a seat bottom 24 including a panel 102, 202, 302 pivotable from a first position to a second position. The assembly 100, 200, 300 includes a track 26 supported by the seat bottom 24. The assembly 100, 200, 300 includes a spring 28 in the track 26 and urging the panel 102, 202, 302 toward the second position. The assembly 100, 200, 300 includes a pyrotechnic actuator 30 maintaining the spring 28 in compression and actuatable to release the spring 28.

Moving the panel 102, 202, 302 from the first position to the second position changes a location and/or angle of a normal force exerted on an occupant of the seat 20 by the seat bottom 24. The assembly 100, 200 in the second position (shown in FIGS. 3, 5, and 7) may control lateral movement of the occupant, e.g., by increasing a height of one or both sides 34, 36 of the seat bottom 24. For example, the panel 102, 202 may be pivotable about a longitudinal axis A2 from the first position to the second position. The assembly 300 in the second position (shown in FIG. 9) may control longitudinal movement by increasing a height at a front end 32 of the seat bottom 24. For example, the panel 302 may be pivotable about a lateral axis A1 from the first position to the second position. The spring 28, track 26, and pyrotechnic actuator 30 control movement of the panel 102, 202, 302 from the first position to the second position.

The vehicle 22 includes a passenger cabin to house occupants, if any, of the vehicle 22. The passenger cabin includes one or more seats 20. The seat 20 is shown to be a bucket seat, but the seats 20 may be other types. The position and orientation of the seats 20 and components thereof may be adjustable.

The seat 20 includes a seat back 38 and the seat bottom 24. The seat back 38 may be supported by the seat bottom 24 and may be stationary or movable relative to the seat bottom 24. The seat bottom 24 and/or the seat back 38 may include a frame and a covering supported on the frame. The frame may include tubes, beams, etc. The frame may be any suitable plastic material, e.g., carbon fiber reinforced plastic (CFRP), glass fiber-reinforced semi-finished thermoplastic composite (organosheet), etc. As another example, some or all components of the frame may be a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the frame and may be form or any other suitable material.

The seat bottom 24 includes the front end 32 and a back end 40. The front end 32 is spaced from the back end 40. The seat back 38 is at the back end 40. The seat back 38 is spaced from the front end 32. The seat bottom 24 includes the first side 34 and the second side 36, e.g., a right side 34 and a left side 36. The first side 34 and the second side 36 are spaced from each other along the lateral axis A1. The first side 34 and the second side 36 extend from the front end 32 to the back end 40. The seat back 38 extends from the first side 34 to the second side 36 at the back end 40.

The seat bottom 24 defines the lateral axis A1, i.e., extending between the first side 34 and the second side 36, e.g., parallel to the seat back 38. In other words, the second side 36 is spaced from the first side 34 along the lateral axis A1. The seat bottom 24 defines the longitudinal axis A2, i.e., extending between the front end 32 and the back end 40 of the seat back 38, e.g., perpendicular to the seat back 38. In other words, the front end 32 is spaced from the back end 40 along the longitudinal axis A2. The longitudinal axis A2 and the lateral axis A1 are perpendicular to each other.

The panel 102, 202, 302 supports an occupant of the seat 20. The panel 102, 202, 302 is generally planar. The panel 102, 202, 302 may include one or more openings 48. The panel 102, 202, 302 may be sheet steel, steel rods fixed in a grid, or any other suitable material and shape suitable for performing as described herein. The panel 102, 202, 302 may have covering including upholstery and padding. The panel 102, 202, 302 is pivotally supported by the frame of the seat bottom 24, e.g., with a hinge 104, 204, 304. The hinge 104, 204, 304 may have a first hinge portion fixed relative to the panel 102, 202, 302, a second hinge portion fixed relative to the seat frame, and a pin connecting the first hinge portion and the second hinge portion. The hinge 104, 204, 304 may be a living hinge or other suitable structure. The panel 102, 202, 302 includes a front edge 106, 206, 306 and a back edge 108, 208, 308. The front edge 106, 206, 306 is spaced from the back edge 108, 208, 308 along the longitudinal axis A2.

Figure 2:
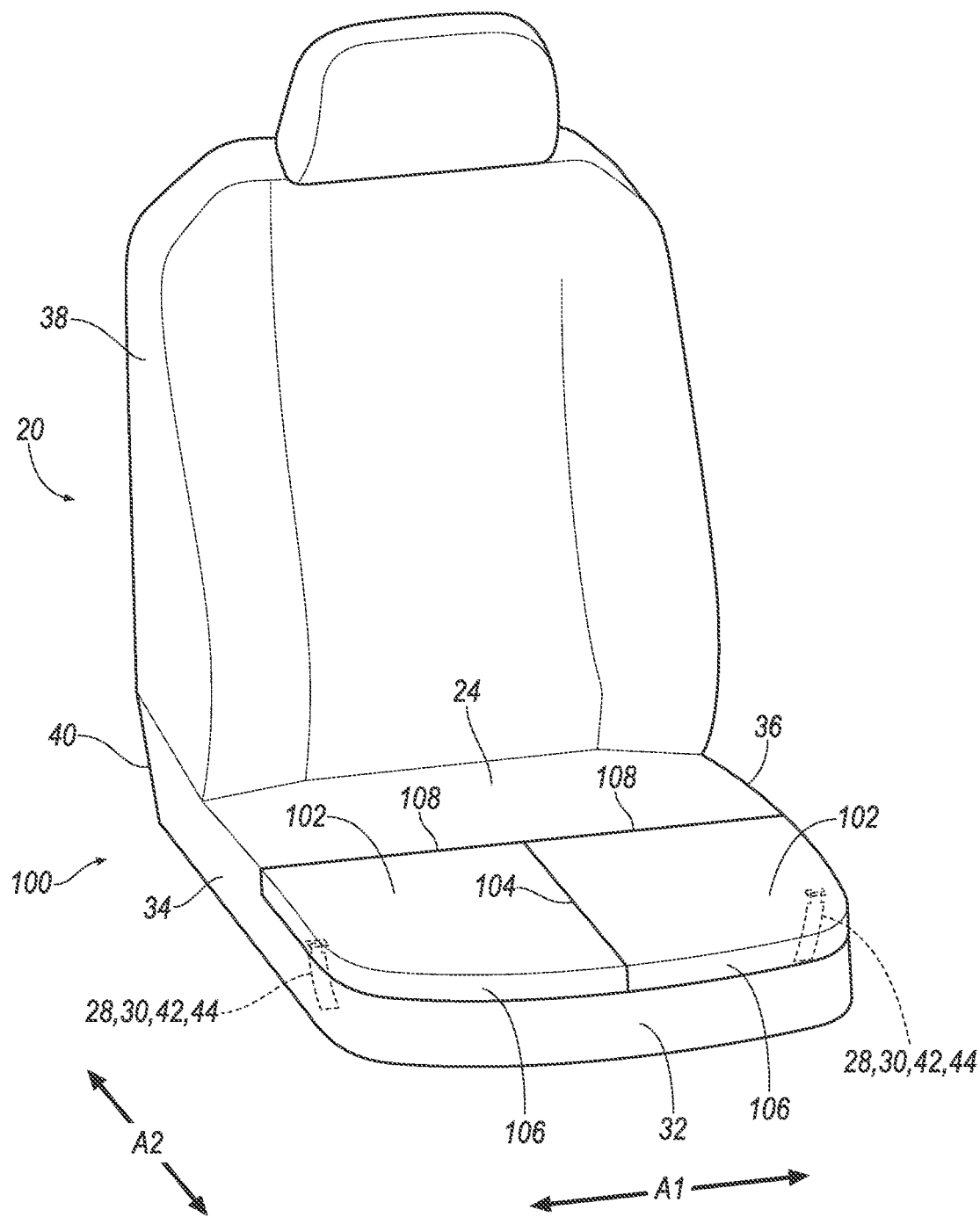
FIG. 2 is a perspective view of the seat and the system for controlling kinematics of an occupant of the seat.
Figure 3:
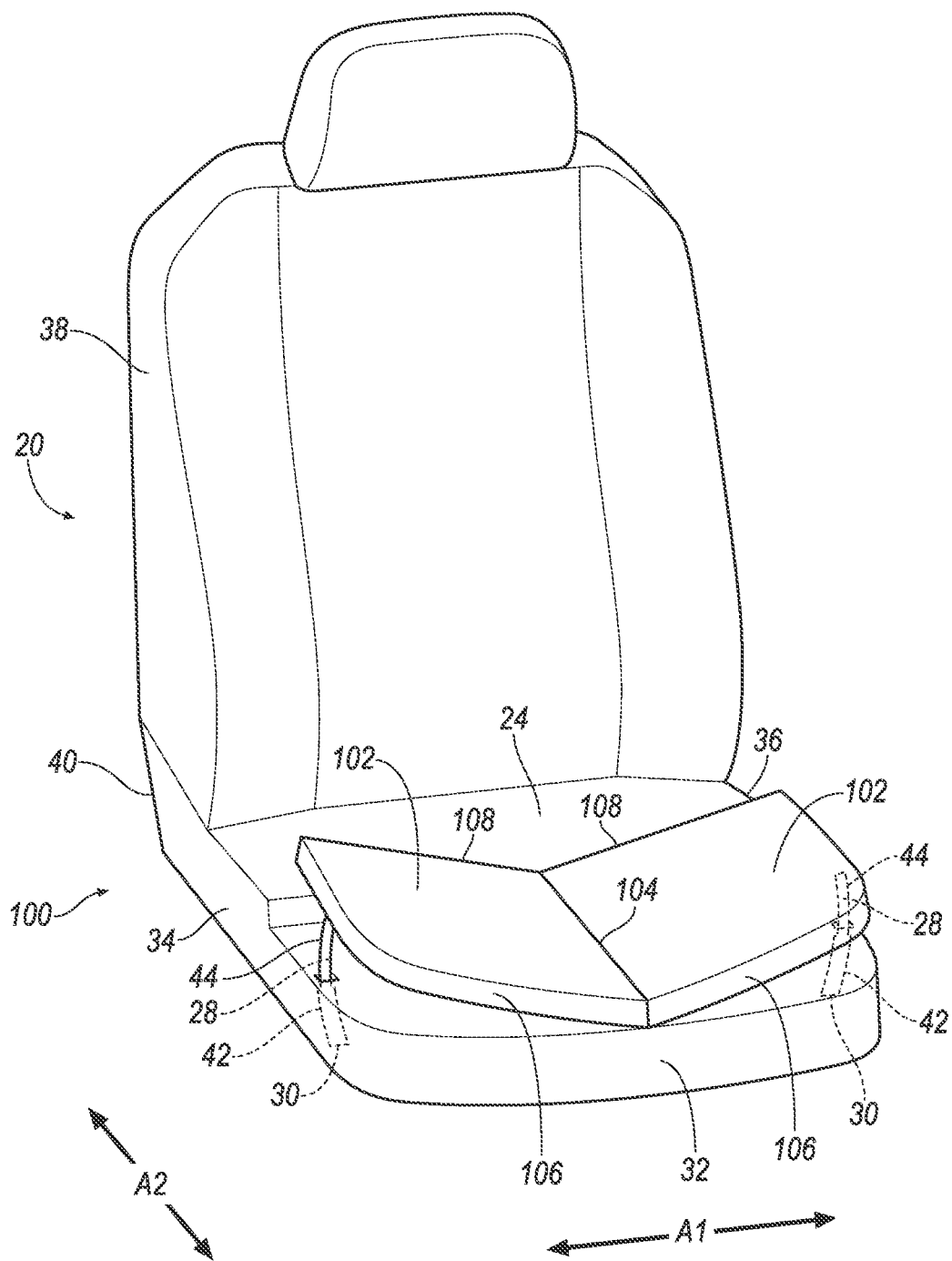
FIG. 3 is a perspective view of the seat and the system for controlling kinematics of an occupant of the seat.
Figure 6:
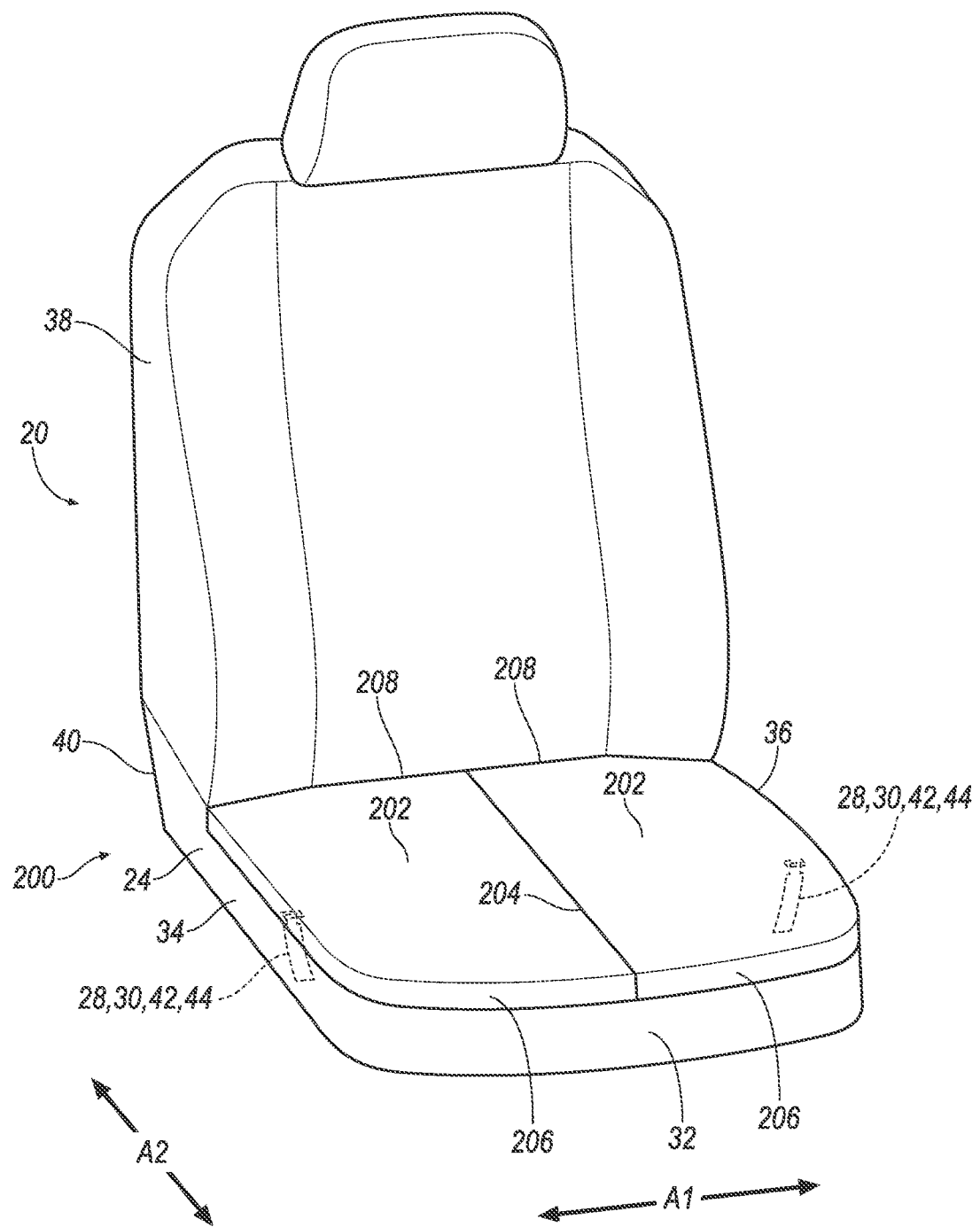
FIG. 6 is a perspective view of the seat and a system for controlling kinematics of an occupant of the seat.
Figure 7:
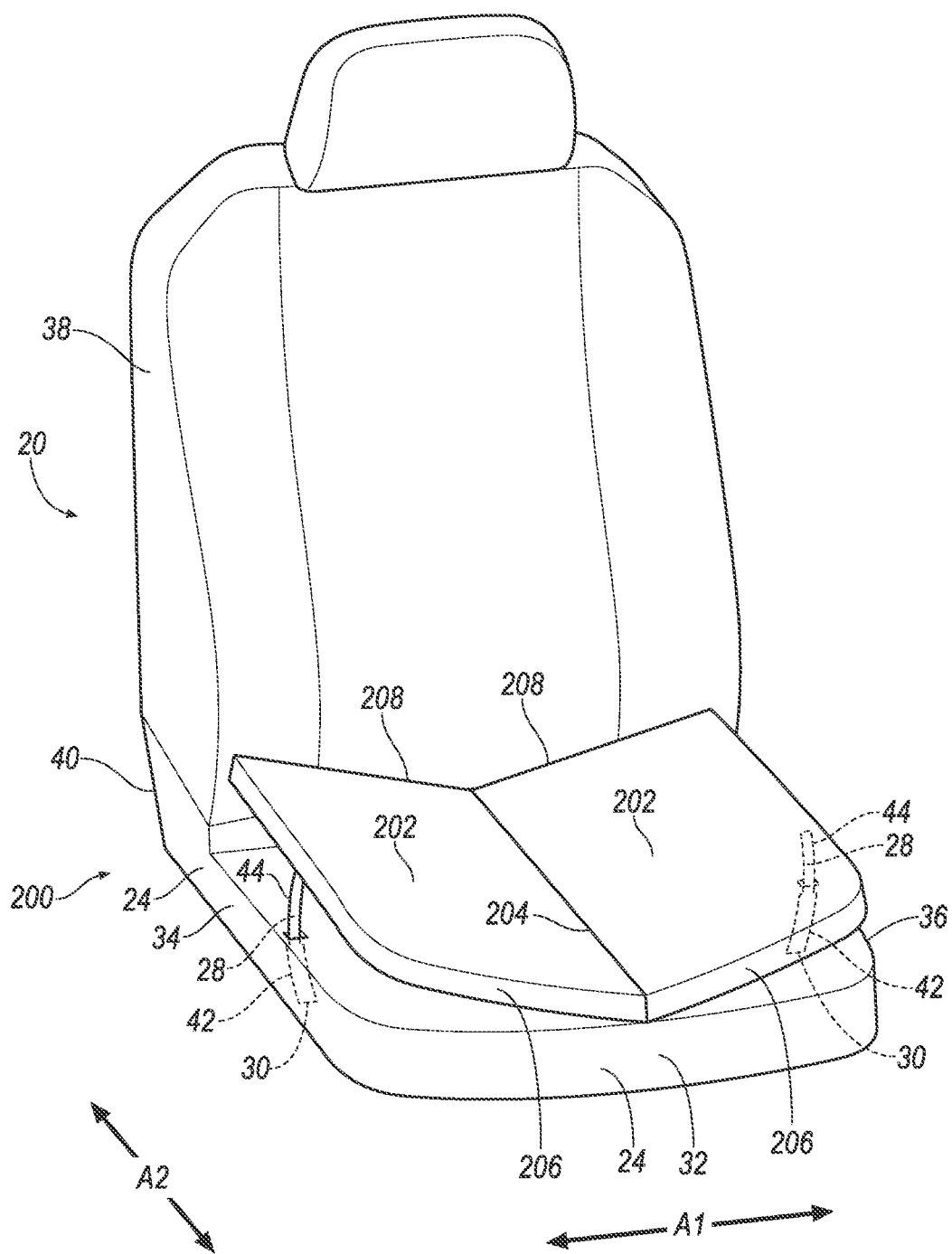
FIG. 7 is a perspective view of the seat and the system for controlling kinematics of an occupant of the seat of FIG. 6.

The panel 102, 202, 302 is pivotable, e.g., about the hinge 104, 204, 304, from the first position (shown in FIGS. 1, 2, 4-6, and 8) to the second position (shown in FIGS. 3, 5, and 7). The panel 102, 202, 302 in the second position is above the first position. In other words, the panel 102, 202, 302 may pivot upwardly (e.g., away from a floor of the vehicle 22) from the first position to the second position.

With reference to FIGS. 4 and 5, the track 26 guides movement of the spring 28, e.g., by causing the spring 28 to extend and compress along a path. The track 26 may include a first member 42 and a second member 44 slidable relative to the first member 42. The first member 42 and the second member 44 may be cylindrical, or any other suitable shape. The first member 42 may define a passage 46. The passage 46 may be partially or completely surrounded by the first member 42. For example, the passage 46 may be a cavity encircled by the first member 42. The second member 44 may be in the passage 46. The second member 44 may be slip-fit within the passage 46 of the first member 42. The second member 44 may slide relative to the first member 42 as the panel 102, 202, 302 moves from the first position to the second position. The track 26 may be another suitable structure, e.g., a groove, a channel between two members, etc. The track 26 is supported by the seat bottom 24. For example, the first member 42 may be supported by the frame of the seat bottom 24. The first member 42 may be fixed to the frame of the seat bottom 24 via fastener, weld, etc.

The first member 42 may include an opening 48, e.g., a circular hole. The opening 48 may extend through the first member 42. In other words, the opening 48 may extend from in the passage 46 to outside the first member 42.

The first member 42 may include a support member 50. The support member 50 may include a slot or other opening permitting the second member 44 to slide there through. The support member 50 may extend inwardly from an inner surface of the second member 44.

The second member 44 may include a pin 52. The pin 52 may be movable from a first position (shown in FIG. 4) to a second position (shown in FIG. 5). An end of the pin 52 in the first position may be generally flush with an outer surface of the second member 44. The pin 52 in the second position may extend away from the outer surface. The second member 44 may include a spring 54 urging the pin 52 from the first position toward the second position.

The pin 52 is selectively engageable with the opening 48 to restrict relative movement between the first member 42 and the second member 44. For example, the pin 52 may be in the first position when the panel 102, 202, 302 is in the first position and the pin 52 may be in the second position and in the opening 48 when the panel 102, 202, 302 is in the second position.

The spring 28 urges the panel 102, 202, 302 from the first position toward the second position. For example, the spring 28 may be a coil spring that stores mechanical energy when compressed and may be more compressed when the panel 102, 202, 302 is in the first position than in the second position. The spring 28 is supported by the seat bottom 24. The spring 28 may be in the track 26, e.g., surrounded by the second member 44. The spring 28 may be between the panel 102, 202, 302 and the support member 50 of the first member 42.

The panel 102, 202, 302 is releasably fixed in the first position. For example, a wire 56 may be fixed relative to the panel 102, 202, 302 and relative to the first member 42. The wire 56 may maintain the panel 102, 202, 302 in the first position until released from the first member 42.

The pyrotechnic actuator 30 maintains the panel 102, 202, 302 in the first position and the spring 28 in compression. For example, the wire 56 may be fixed to the pyrotechnic actuator 30 prior to actuation. As another example, a cutting portion of the pyrotechnic actuator 30 may be space from the wire 56 prior to actuation.

The pyrotechnic actuator 30 is actuatable to release the spring 28 and the panel 102, 202, 302 to the second position. The pyrotechnic actuator 30 includes pyrotechnic material that ignites, combusts, detonates, and/or explodes upon actuation. The pyrotechnic actuator 30 may actuate in response to receiving a command from a computer 58. For example, actuation of the pyrotechnic actuator 30 may release the wire 56 from the pyrotechnic actuator 30, e.g., a portion of the pyrotechnic actuator 30 fixed to the wire 56 may be destroyed during actuation. As another example, the pyrotechnic actuator 30 may include a cutter that is actuated to server the wire 56.

With reference to FIGS. 1-7, the panel 102, 202 may pivotable about the longitudinal axis A2 of the seat 20. For example, the hinge 104, 204 may extend parallel to the longitudinal axis A2. The hinge 104, 204 may be between the first side 34 and the second side 36 of the seat bottom 24, e.g., at a longitudinally extending centerline of seat bottom 24. The spring 28 may be at the one of the sides 34, 36, e.g., closer to the first side 34 than the second side 36 or vice-versa. This combination of features enables the panel 102, 202 in the second position to increase a height of one of the sides 34, 36 of the seat bottom 24 to control lateral movement of an occupant of the seat 20.

With continued reference to FIGS. 1-7, the seat bottom 24 may include another panel 102, 202 pivotable from a first position to a second position. The panels 102, 202 may be arranged along the lateral axis A1. In other words, one panel 102, 202 may be at the first side 34 of the seat bottom 24 and the other panel 102, 202 may be at the second side 36 of the seat bottom 24. The panels 102, 202 may be pivotable about a same axis, e.g., pivot about a common pin. The panels 102, 202 may be individually and selectively actuatable, e.g., to control lateral movement of an occupant of toward the first side 34 or second side 36. The seat bottom 24 may include another track 26, first member 42, second member 44, spring 28, actuator 30, etc., for moving the second panel 102, 202 to the second position.

With reference to the assembly 100 shown in FIGS. 1-3, the front edge 106 of the panel 102 may be at the front end 32 of the seat bottom 24 and the back edge 108 of the panel 102 may be between the front end 32 and the back end 40 of the seat bottom 24. For example, the back edge 108 of the panel 102 may be midway between the front end 32 and the back end 40 of the seat bottom 24.

With reference to the assembly 200 shown in FIGS. 6 and 7, the panel 202 may extend from the front end 32 to the back end 40 of the seat bottom 24. In other words, the front edge 206 of the panel 202 may be at the front end 32 of the seat bottom 24 and the back edge 208 of the seat bottom 24 may be at the back end 40 of the seat bottom 24.

Figure 8:
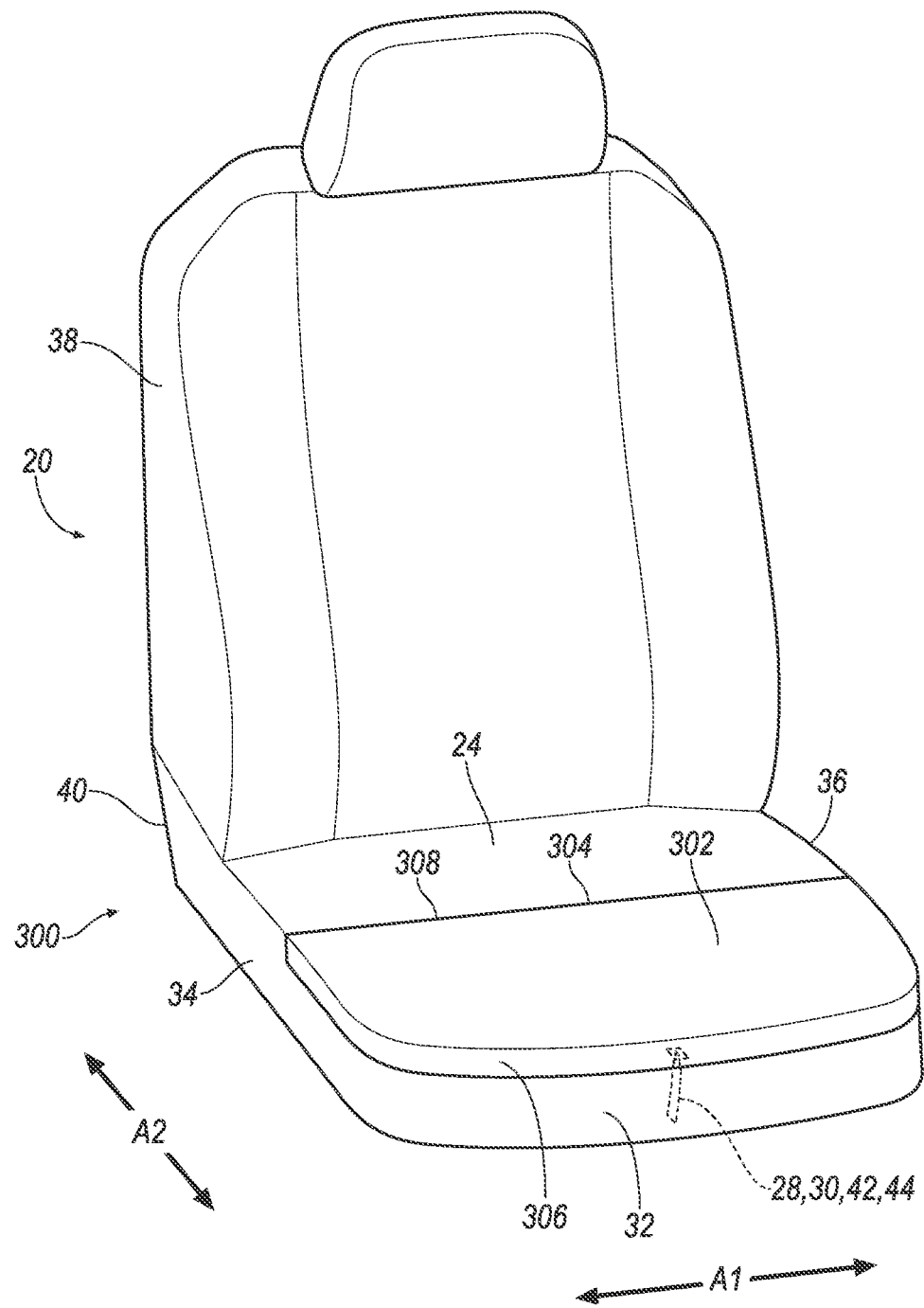
FIG. 8 is a perspective view of the seat and a system for controlling kinematics of an occupant of the seat.
Figure 9:
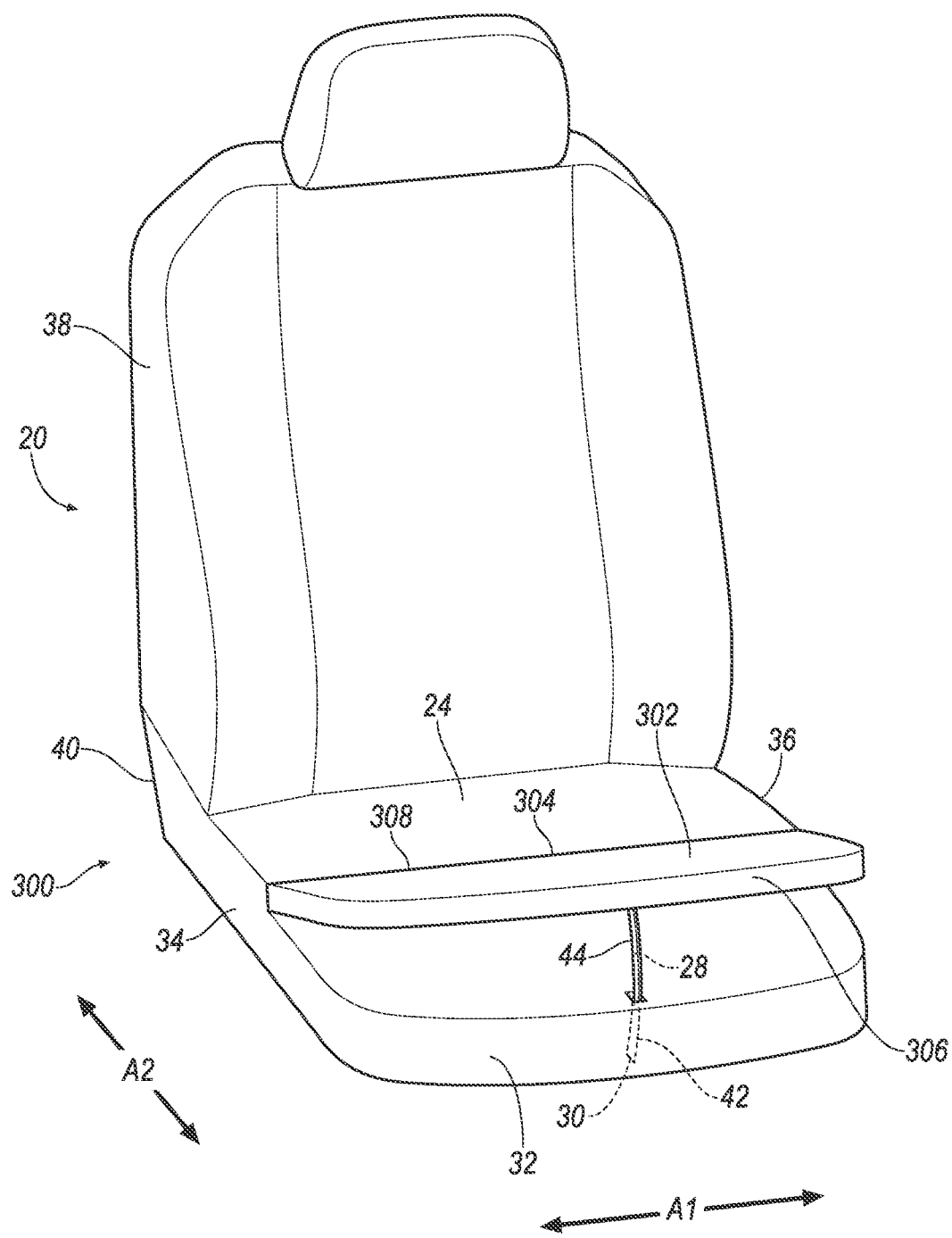
FIG. 9 is a perspective view of the seat and the system for controlling kinematics of an occupant of the seat of FIG. 8.

With reference to the assembly 300 shown in FIGS. 8 and 9, the panel 302 may be pivotable about the lateral axis A1 of the seat bottom 24. For example, the panel 302 may pivot at the back edge 308 with the front edge 306 in the second position being higher than in the first position. As another example, the hinge 304 may extend parallel to the lateral axis A1. The hinge 304 may be between the front end 32 and the rear end of the seat bottom 24.

Figure 10:
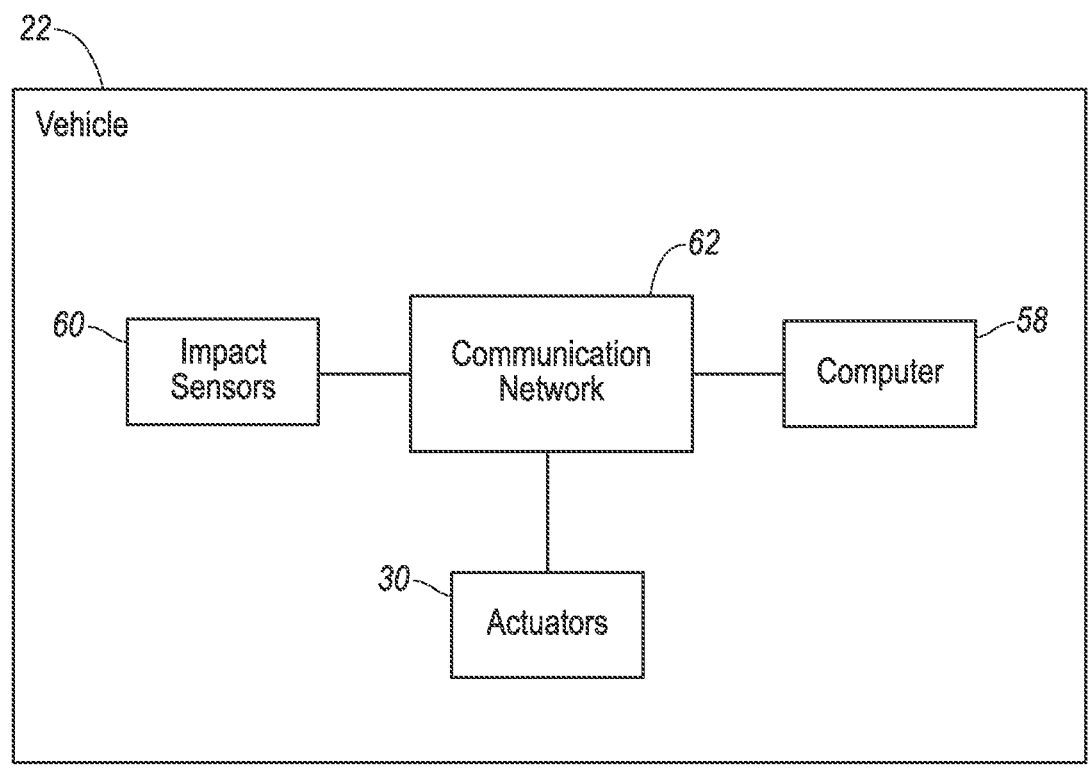
FIG. 10 is block diagram of component of the vehicle.

With reference to FIG. 10, the vehicle 22 may include an impact sensor 60 in communication with the computer 58. The impact sensor 60 is programmed to detect an impact to the vehicle 22. The impact sensor 60 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 60 may be located at numerous points in or on the vehicle 22.

The vehicle 22 may include a communication network 62. The communication network 62 includes hardware, such as a communication bus, for facilitating communication among vehicle 22 and assembly 100, 200, 300 components such as the computer 58, the impact sensor 60 and the actuator 30. The communication network 62 may facilitate wired or wireless communication among the components in accordance with a number of communication protocols such as controller area network (CAN), Ethernet, WiFi, Local Interconnect Network (LIN), and/or other wired or wireless mechanisms.

In the event of an impact, the impact sensor 60 may detect the impact and transmit a signal through the communication network 62 to the computer 58.

The computer 58 may be a microprocessor-based controller implemented via circuits, chips, or other electronic components. For example, the computer 58 may include a processor, memory, etc. The memory of the computer 58 may include memory for storing instructions executable by the processor as well as for electronically storing data and/or databases The computer 58 may store instructions executable by the processor to actuate the actuator 30 to move the panel 102, 202, 302 to the second position in response to detecting an impact to a vehicle 22. Use of "in response to" indicates a causal relationship, not merely a temporal relationship. For example, in the event of an impact, the impact sensor 60 may detect the impact and transmit a signal through the communication network 62 to the computer 58. The signal may specify a type or location of the impact relative to the vehicle 22, e.g., a side impact to the left side of the vehicle 22, a side impact to the right side of the vehicle 22, an impact to the front of the vehicle 22, etc. In response to receiving the signal from the impact sensor 60, the computer 58 may transmit a signal through the communication network 62 to one or more actuators 30. In response to receiving the signal from the computer 58 the one or more actuators 30 may actuate and cause one or more panels 102, 202, 302 to move from the first positions to the second positions.

The computer 58 may selectively actuate various actuators 30 to move the panel 102, 202 at the first side 34 of the seat bottom 24 to the second position in response to detecting an impact to a right side of the vehicle 22, and to move the panel 102, 202 at the second side 36 of the seat bottom 24 to the second position in response to detecting an impact to a left side of the vehicle 22. In other words, the computer 58 may actuate the actuator 30 that controls the panel 102, 202 on the same side (e.g., right or left) as the impact to the vehicle 22 to move such panel 102, 202 to the second position. Such actuation may control lateral movement of an object in the seat 20.

The computer 58 may selectively actuate various actuators 30 to move the panels 102 to the second positions in response to detecting an impact to a front of the vehicle 22. In other words, the computer 58 may actuate both actuators 30 that control the panels 102 (e.g., on the first side 35 and second side 36) in response to receiving a signal form the impact sensor 60 that specifies a front impact. Such actuation may control longitudinal movement of an object in the seat 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a seat bottom including a panel pivotable from a first position to a second position;
a track supported by the seat bottom, the track including a first member and a second member, the first member defining a passage, the second member slidable within the passage and relative to the first member;
a spring in the track and urging the panel toward the second position, the spring surrounded on multiple sides by the second member of the track; and
a pyrotechnic actuator maintaining the spring in compression and actuatable to release the spring.

2. The assembly of claim 1, wherein the first member includes an opening, and the second member includes a pin movable from a first pin position that is not in the opening when the panel is in the first position to a second pin position that is in the opening when the panel is in the second position.

3. The assembly of claim 2, wherein the spring is a first spring and further comprising a second spring, the second spring urging the pin from the first pin position to the second pin position.

4. The assembly of claim 1, wherein the panel is pivotable about a lateral axis extending from a right side of the seat bottom to a left side of the seat bottom.

5. The assembly of claim 1, wherein the panel is pivotable about a longitudinal axis extending from a front end of the seat bottom to a back end of the seat bottom.

6. The assembly of claim 1, wherein the seat bottom includes a front end and a back end, the panel including a front edge and a back edge, the front edge at the front end of the seat bottom and the back edge between the front end and the back end of the seat bottom.

7. The assembly of claim 1, wherein the seat bottom includes a second panel pivotable from a first position to a second position.

8. The assembly of claim 1, wherein the second position is above the first position.

9. An assembly, comprising:
a seat bottom having a front end and a back end and including a panel pivotable about a longitudinal axis from a first position to a second position, the longitudinal axis extending from the front end to the back end;
a track supported by the seat bottom, the track including a first member and a second member, the first member defining a passage, the second member slidable within the passage and relative to the first member;
a wire maintaining the panel in the first position, the wire disposed within the passage defined by the first member; and
an actuator actuatable to release the wire and permit movement of the panel to the second position.

10. The assembly of claim 9, wherein the wire is disposed within the second member of the track.

11. The assembly of claim 9, further comprising a spring in the track and urging the panel toward the second position, the spring surrounded by the second member of the track.

12. The assembly of claim 9, further comprising a computer having a processor and a memory storing instructions executable by the processor to actuate the actuator to move the panel to the second position in response to detecting an impact to a vehicle.

13. The assembly of claim 9, wherein the panel is a first panel and wherein the seat bottom includes a second panel pivotable from a first position to a second position, the first panel and the second panel arranged along a lateral axis.

14. The assembly of claim 13, further comprising a computer having a processor and a memory storing instructions executable by the processor to move the first panel to the second position in response to detecting an impact to a first side of a vehicle, and to move the second panel to the second position in response to detecting an impact to a second side of the vehicle opposite the first side.

15. The assembly of claim 13, further comprising a computer having a processor and a memory storing instructions executable by the processor to move the first panel and the second panel to the second positions in response to detecting an impact to a front of a vehicle.

16. The assembly of claim 9, further comprising a spring supported by the seat bottom and urging the panel toward the second position.

17. The assembly of claim 9, further comprising a seatback, wherein the back end of the seat bottom is at the seatback, the panel includes a front edge and a back edge, the front edge at the front end of the seat bottom and the back edge between the front end and the back end of the seat bottom.

18. The assembly of claim 16, wherein the actuator is a pyrotechnic actuator that maintains the spring in compression and is actuatable to release the spring.

19. An assembly, comprising:
a seat bottom including a first panel pivotable from a first position to a second position and a second panel pivotable from a first position to a second position, the first panel and the second panel pivotable about a same longitudinal axis extending from a front end of the seat bottom to a rear end of the seat bottom, the first panel extending from the same longitudinal axis toward a first side of the seat bottom in a first direction and the second panel extending from the same longitudinal axis toward a second side of the seat bottom in a second direction opposite the first direction, the first side spaced from the second side along a lateral axis, the same longitudinal axis centered on the seat bottom along the lateral axis;
a track supported by the seat bottom;
a spring in the track and urging the first panel toward the second position; and
an actuator maintaining the spring in compression and actuatable to release the spring.

20. The assembly of claim 19, wherein the actuator is a pyrotechnic actuator that maintains the spring in compression and is actuatable to release the spring.

* * * * *